United States Patent
Akulichev et al.

(10) Patent No.: US 10,047,261 B2
(45) Date of Patent: Aug. 14, 2018

(54) ELASTOMERIC SEAL

(71) Applicant: FMC Kongsberg Subsea AS, Kongsberg (NO)

(72) Inventors: Anton Akulichev, St. Petersburg (RU); Brede Thorkildsen, Solbergelva (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 14/888,704

(22) PCT Filed: May 5, 2014

(86) PCT No.: PCT/EP2014/059119
§ 371 (c)(1),
(2) Date: Nov. 2, 2015

(87) PCT Pub. No.: WO2014/177720
PCT Pub. Date: Nov. 6, 2014

(65) Prior Publication Data
US 2016/0068728 A1    Mar. 10, 2016

(30) Foreign Application Priority Data
May 3, 2013  (NO) .................................. 20130622

(51) Int. Cl.
    *C09K 3/10*    (2006.01)
    *F16J 15/00*   (2006.01)
    (Continued)

(52) U.S. Cl.
    CPC .............. *C09K 3/1025* (2013.01); *C08K 3/01* (2018.01); *C09K 3/10* (2013.01); *C09K 3/1006* (2013.01);
    (Continued)

(58) Field of Classification Search
    CPC ............. C08L 27/12–27/20; C08K 2003/2258
    See application file for complete search history.

(56) References Cited

U.S. PATENT DOCUMENTS 3,061,130 A * 10/1962 Husum ................. B65D 41/02
                                                    215/347
4,427,801 A *  1/1984 Sweet ..................... C08L 83/04
                                                    523/212
(Continued)

FOREIGN PATENT DOCUMENTS

EP    1 772 481 A1    4/2007
JP    57083553 A  *   5/1982
(Continued)

OTHER PUBLICATIONS

Machine translated English language equivalent of JP 57-083553 (1982, 2 pages).*

(Continued)

*Primary Examiner* — Brieann R Johnston

(57) ABSTRACT

The present invention provides a seal comprising an elastomeric composite, said composite comprising an elastomeric polymer and a negative thermal expansion (NTE) filler, the NTE filler has a coefficient of thermal expansion (CTE) lower than $-6 \times 10^{-6}$ K-1 within a temperature range of 220-293 K and is present in an amount of 0.01-50 volume % based on the total volume of the elastomeric composite at 20° C.

26 Claims, 5 Drawing Sheets

(51) Int. Cl.
*C08K 3/22* (2006.01)
*F16J 15/10* (2006.01)
*C08K 3/01* (2018.01)

(52) U.S. Cl.
CPC ........... *C09K 3/1009* (2013.01); *F16J 15/102* (2013.01); *C08K 2003/2244* (2013.01); *C08K 2003/2258* (2013.01); *C08K 2003/2293* (2013.01); *C09K 2003/1053* (2013.01); *C09K 2200/02* (2013.01); *C09K 2200/0213* (2013.01); *C09K 2200/0226* (2013.01); *C09K 2200/0234* (2013.01); *C09K 2200/0239* (2013.01); *C09K 2200/0607* (2013.01); *C09K 2200/0612* (2013.01); *C09K 2200/0637* (2013.01)

(56) References Cited

U.S. PATENT DOCUMENTS

| | | | |
|---|---|---|---|
| 5,294,133 | A | 3/1994 | Dutta |
| 6,719,867 | B1 * | 4/2004 | Mileti ................. B29C 66/0044 156/251 |
| 7,347,242 | B2 * | 3/2008 | Agostini ................. C08K 3/20 152/516 |
| 7,604,049 | B2 | 10/2009 | Vaidya et al. |
| 7,696,275 | B2 | 4/2010 | Slay et al. |
| 8,096,353 | B2 | 1/2012 | Ver Meer |
| 8,314,177 | B2 | 11/2012 | Chakraborty et al. |
| 2003/0024417 | A1 * | 2/2003 | Vomberg ................. B27N 3/08 100/214 |
| 2004/0110322 | A1 | 6/2004 | Hougham et al. |
| 2005/0161212 | A1 | 7/2005 | Leismer et al. |
| 2007/0135550 | A1 * | 6/2007 | Chakrapani ............ B82Y 30/00 524/406 |
| 2008/0164593 | A1 * | 7/2008 | Hess ..................... H01L 21/561 257/682 |

FOREIGN PATENT DOCUMENTS

| | | |
|---|---|---|
| JP | 63242610 A * | 10/1988 |
| WO | WO 94/03743 A1 | 2/1994 |
| WO | WO 2004/094514 A1 | 11/2004 |
| WO | WO 2005/014708 A1 | 2/2005 |

OTHER PUBLICATIONS

Machine translated English language equivalent of JP 63-242610 (1988, 3 pages).*
Derwent Abstract of JP 57-083553 (Acc. No. 1982-53984E, 1982, 2 pages).*
Derwent Abstract of JP 63-242610 (Acc. No. 1988-327634, 1988, 2 pages).*
Human translation of JP 57-08553 (2017, 8 pages).*

* cited by examiner

ELASTOMERIC SEAL

FIELD OF THE INVENTION

The present invention concerns the field of sealing, more specifically elastomeric seals for use in cold environments.

BACKGROUND OF THE INVENTION

It is a well known fact that elastomeric materials may contract substantially, and become much stiffer at low temperatures. These properties often make elastomeric seals unsuitable for use in cold environments, especially in low pressure sealing conditions with gas, and may in the worst case result in leakage. The consequences of spillage of hydrocarbons or aggressive chemicals may be serious. In addition to potential personnel damage, or even loss of life, damage to the environment may also occur. The last point is highly relevant in cold areas, wherein the environment is very sensitive to pollution.

There are a number of elastomeric materials for sealing at very low temperatures; however most of them are hardly compatible with aggressive fluid service or typically are not able to maintain the required high temperature exposure. A well known example is the reduction of nitrile content in NBR elastomer compounds. Such reduction leads to a substantially increased cold performance, but has a simultaneous negative impact on chemical resistance.

Non-metallic seals are also formed from elastomeric compounds that typically enclose medium or large volumes of various fillers to impart higher hardness and strength, enlarge lifetime at high temperatures and enhance resistance to various forms of material degradation. These fillers may constitute silica, carbon black, graphite, graphene, carbon nanotubes, nanoclays or a specific combination thereof, as for example is disclosed in U.S. Patent Application Publication No. 2005/0161212 A1; U.S. Pat. Nos. 7,604,049, 8,096,353, 8,314,177 and 7,696,275; and International Patent Application Publication No. WO 2005/014708 A1. Unfortunately, adding those reinforcement fillers into elastomer formulations does not give any benefit for low temperature flexibility and resilience of the elastomeric seals, and very often inhibits the latter, which manifests itself in an increase of minimum leakage temperatures.

Therefore other approaches need to be considered for sealing aggressive media under cold conditions.

U.S. Pat. No. 5,294,133 describes a solution for sealing two concentric elements at low temperatures. Basically, this patent describes a hollow elastomeric O-ring filled with a liquid. The fluid core expands in cold weather with temperature drop and compensates for thermal contraction and loss of resilience of the elastomer. The solution proposed requires injection of the liquid by a syringe or a needle through the O-ring wall, which is detrimental for seal integrity. Another drawback of the patent is a low temperature limit associated with the liquid freezing point.

WO 94/03743 discloses a seal with low thermal expansion. The seal comprises a polymer body defining a cavity which may be filled with a material that expands as the temperature decreases, i.e. a material having a negative CTE. The filling material may consist of water, hydrogel, water swellable polymers or a combination thereof. A drawback of such seals is that the main elastomer body has an opening for placing the fill material which needs to be sealed after filling the internal cavity with the filler material. This is not a preferred solution for high pressure retaining systems such as oil and gas producing equipment, since seal integrity is compromised. An alternative solution involving filler injection through a syringe or needle into the internal space of the seal has also been proposed (which is analogous to U.S. Pat. No. 5,294,133, and with the same integrity issue).

It is also known to use a seal that is larger than the volume where it is located so that when it contracts it is still able to fill the volume. However, such a seal has a large drawback in that it is prone to extrusion out of its volume (e.g. out of its groove).

The present invention aims to provide seals which alleviate or avoid at least some of the known drawbacks and disadvantages of the prior art techniques.

SUMMARY OF THE INVENTION

The object of the present invention is to provide an improved sealing technology applicable in extreme low temperature environments while not compromising the required aggressive fluid resistance. In cold climates, elastomeric seals in pressure containment equipment contract with temperature decrease much more than steel and therefore might lose energization/interference with their sealed counterparts, which eventually could lead to a leak in the system. The present solution overcomes this problem by making the seals from a composite material comprising an elastomeric polymer and a negative thermal expansion (NTE) material. The NTE material is in a predefined volume fraction to produce a composite having the required coefficient of thermal expansion. The elastomeric composite will account for seal contraction and provide an additional energizing effect at low temperatures. It is recognized that low pressure sealing situations, and in particular those with gas, are challenging at low temperatures. An NTE composite will be particularly useful for such situations.

The present invention provides a seal comprising an elastomeric composite, said composite comprising an elastomeric polymer and a negative thermal expansion (NTE) filler, the NTE filler having a coefficient of thermal expansion (CTE) lower than $-6 \times 10^{-6}$ $K^{-1}$ within a temperature range of 220-293 K and being present in an amount of 0.01-50 volume % based on the total volume of the elastomeric composite at 20° C.

In one aspect of the seal according to the invention, the amount of NTE filler is in the range of 1.0-30 volume % based on the total volume of the elastomeric material at 20° C. Depending on the type of elastomeric polymer and NTE filler, the range may optionally be 1.0-25 volume %, 1.0-20 volume %, 1.0-15 volume %, 2.0-30 volume % or 5.0-30 volume %.

In a further aspect of the seal according to the invention, the elastomeric polymer is a synthetic rubber, such as a rubber which may preferably be chosen from the group consisting of NBR (nitrile butadienes), HNBR (hydrogenated nitrile butadienes), FKM (fluoroelastomers) or FFKM (perfluoroelastomers), or any combination thereof.

In another aspect of the seal according to the invention, the NTE filler is chosen from the group of metal tungstates, metal phosphates, metal molybdates, metal vanadates, metal arsenates, metal nickelates, metal oxides, metal nitrides, metal cyanides, magnetic nanocrystalline materials, Invar alloys, or any combination thereof. Preferably, the NTE filler is zirconium tungstate ($ZrW_2O_8$), hafnium tungstate ($HfW_2O_8$), $Zr_2P_2WO_{12}$, $Hf_2P_2WO_{12}$, $HfMg(WO_4)_3$, $BiNiO_3$, $BiNiO_3$-alloys, CuO-nanocrystals, $Cd(CN)_2$, Invar $Fe_3Pt$, or any combination thereof. The term $BiNiO_3$-alloys is intended to encompass any combination of $BiNiO_3$ and a suitable metal, for instance La.

In one aspect of the seal according to the invention, the NTE filler is evenly distributed in the elastomeric composite.

In a further aspect of the seal according to the invention the amount of NTE filler in the elastomeric composite decreases or increases over at least one dimension of the seal. The term dimension is intended to mean in a direction through the volume of the seal, e.g. over a part of the distance from the center to the surface of the seal.

In a further aspect of the seal according to the invention the amount of NTE filler in the elastomeric composite decreases or increases in relation to the distance from the surface of the seal.

In a further aspect of the seal according to the invention the amount of NTE filler decreases or increases in a stepwise or continuous manner.

In one aspect of the seal according to the invention, the amount of NTE filler is such that the volume of the elastomeric material shrinks less than 0.001% over a temperature decrease of 1° C. within a temperature range of −50° C. to +200° C., and preferably within a temperature range of −50° C. to +20° C.

The present invention also comprises the use of an elastomeric composite for the manufacture of a seal according to the invention, said composite comprising an elastomeric polymer and a negative thermal expansion (NTE) filler, the NTE filler having a coefficient of thermal expansion (CTE) lower than $-6 \times 10^{-6}$ K$^{-1}$ within a temperature range of 220-293 K and being present in an amount of 1.0-30 volume % based on the total volume of the elastomeric material at 20° C.

DETAILED DESCRIPTION OF THE INVENTION

The present invention provides a seal for low temperature service made from an elastomeric composite comprising at least one type of NTE filler. There are many designs of elastomeric seals, but a typical representation of such seals is an O-ring. These seals are normally found in clamps, flanges, threaded joints or other mechanical connectors and in assemblies of pressure vessels. That is, any system where there is a need for separating media contained inside a vessel from an outer environment and preventing leakage of said media.

Figure 1:
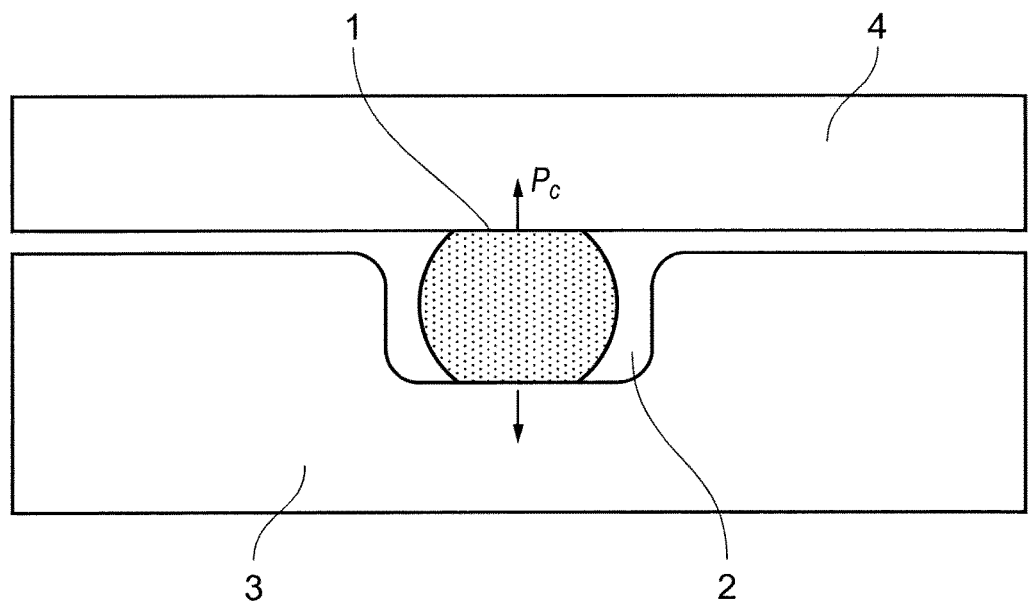
FIG. 1 provides a schematic representation of an O-ring seal placed in the groove of a flange and compressed by a force $P_c$.
Figure 2:
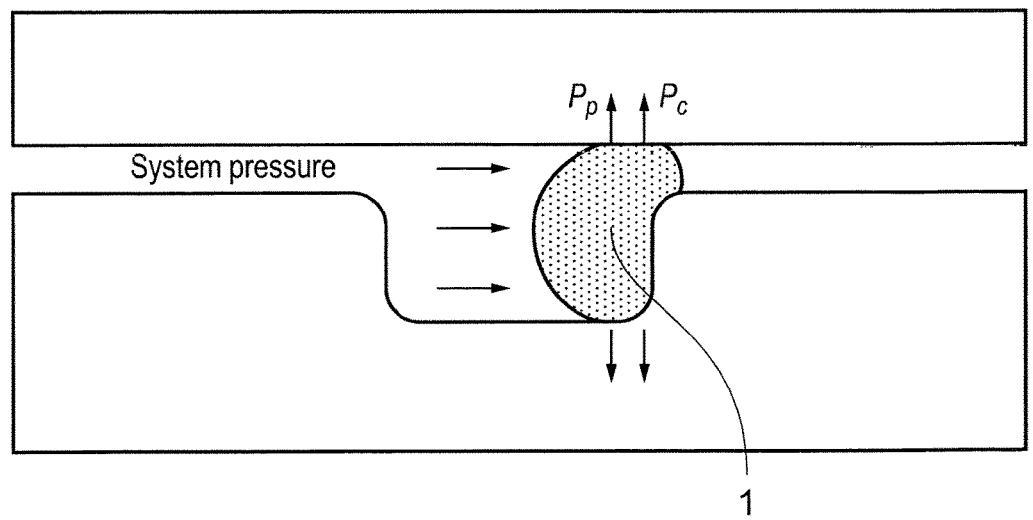
FIG. 2 gives a schematic representation of the O-ring seal in operation under applied pressure.

Referring to FIG. 1, assume an O-ring 1 is placed into a groove 2 of a predefined depth made in one of the parts 3 to be sealed, and then the elastomeric ring is squeezed by a counter part 4 creating a tight interference. The initial interference force, which reflects the sealing capacity, only equals the compression force $P_c$ exerted by the squeezing of the O-ring. When system pressure is applied (FIG. 2), the O-ring 1, due to the flexibility and incompressibility of its material, expands in the direction orthogonal to the applied pressure, and the interference force can be expressed as the sum of the compression force and system pressure $P_p$:

$$S=P_c+P_p$$

Figure 3:
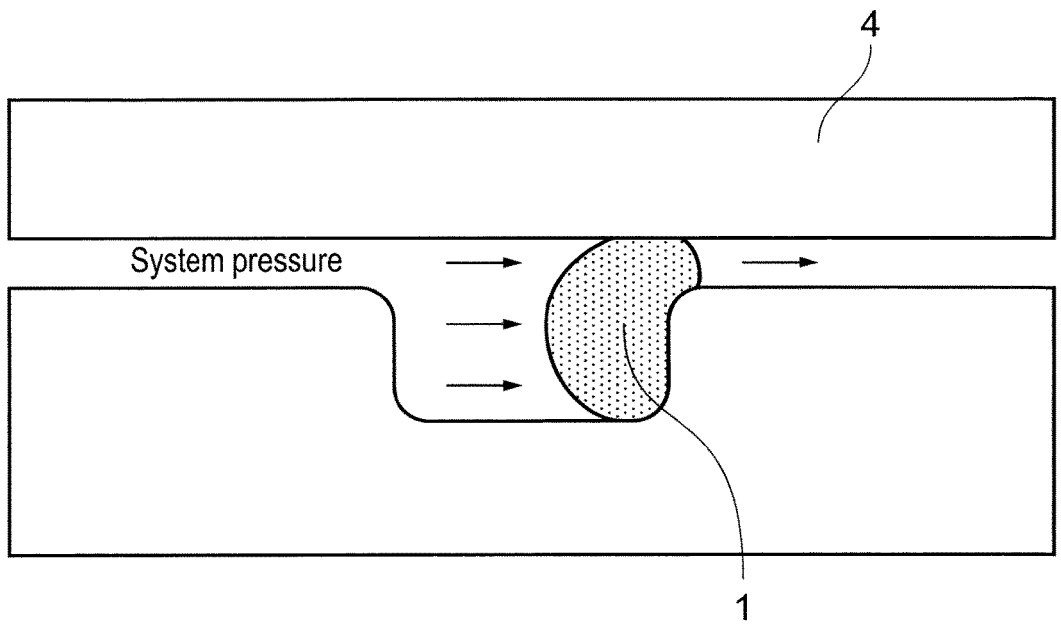
FIG. 3 illustrates contraction of the O-ring seal at low temperatures and the resulting seal leakage.

In the event of a considerable temperature reduction, the elastomeric seals typically contract by an order of magnitude higher than the surrounding steel parts and, moreover, lose their resilience and flexibility. This adversely affects sealing capability and at a certain point, when the interference force is approaching zero, a clearance between the O-ring 1 and the counter part 4 might occur, causing a leakage as illustrated by FIG. 3.

Figure 4:
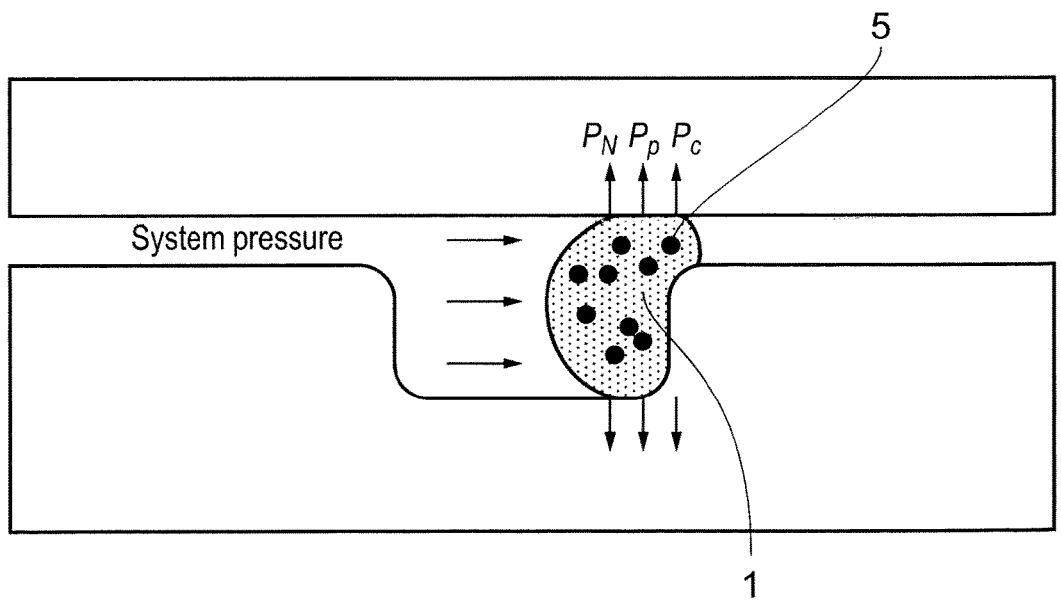
FIG. 4 provides a schematic representation of an O-ring seal according to the invention which is filled with an NTE material to create additional sealing force.

Addition of an NTE material 5 effectively reverses the thermal expansion/contraction behavior of the elastomeric composite (FIG. 4). Seals made of such composites might not just compensate for the contraction of the elastomer part of the composite, but also expand outwards upon cooling and create an additional energization force $P_N$ to maintain the required interface with the counter part. In this case the total interference force is made up of three terms:

$$S=P_c+P_p+P_N.$$

Though an O-ring is used as an example, other elastomeric seal design solutions will also benefit from the invention. These seals may be, for instance, jacketed O-rings, spring seals, also referred to as S-seals, T-seals, U-seals, V-seals, X-seals, flat seals, lip seals, B-seals, back-up rings and gaskets.

The degree of expansion is dependent on temperature, material composition and constituent properties. As the main elastomer material, i.e. the elastomeric matrix containing the NTE filler, any suitable elastomeric polymer may be used. Such polymers include in particular NBR (nitrile butadiene), HNBR (hydrogenated nitrile butadiene), FKM (fluoroelastomers) or FFKM (perfluoroelastomers). Any other type of rubber or thermoplastic might be selected depending on the required fluid compatibility of the seal and the actual operational conditions. In addition to the abovementioned polymers, the elastomeric matrix may include carboxylated acrylonitrile butadiene (XNBR), fluorosilicone (FMQ), chloroprene (CR), ethylene propylene (EPM), ethylene propylene diene (EPDM), polyurethane (PU), tetrafluoroethylene and polypropylene (FEPM), thermoplastics like polyether ether ketone (PEEK), polyether ketone (PEK), polyether ketone ketone (PEKK), polytetrafluoroethylene (PTFE), polyoxymethylene (POM), in addition to various thermosetting polymers such as epoxies.

The illustrated embodiment of FIGS. 1-4 shows a seal wherein the NTE filler is in the form of randomly distributed particles over the volume of the seal. For some applications this may not be the most efficient sealing solution. One alternative is to produce a composite seal with a one-directional (e.g. radial or through-thickness) gradient of concentration of NTE filler, e.g. wherein the surface is deprived of NTE particles whereas the central area is saturated with the same. Alternatively, the core is deprived of NTE particles, while the concentration of said particles increases towards the surface. Preferably, the surface is free of NTE particles, which may be especially useful in dynamic applications to avert abrasive wear caused by NTE particles.

Another solution is to make a core NTE-enriched seal where an NTE element is located in a central area of the seal cross section. The core NTE element might be formed by blending NTE particles with a certain binder material, which essentially can be the same as the base sealing elastomer or virtually any of the polymers mentioned above.

Another example is to have the core formed by an NTE material, and a layer outside the core also comprising NTE material. There might possibly be additional layers outside this layer.

Figure 5:
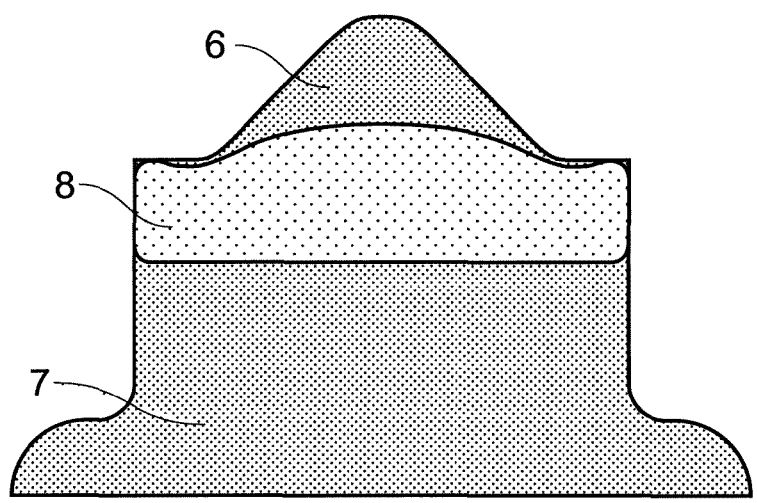
FIG. 5 is a transverse cross-section of a type B seal according to the invention.

An alternative solution (especially for seals of non-regular geometry) is to locate the NTE element(s) in compressed areas of the seals close to the interference to the sealed surfaces, like the compression side of O-rings, thus changing the local thermal response while little disturbing the rest of the seal. This may also provide the benefits of reducing considerable tensile stresses acting on the filler-matrix interphase caused by the installation force. The NTE elements might be molded together with anti-extrusion devices (e.g. springs), or in some cases they can replace the latter if sufficient strength and resilience of the elements is maintained. An example of one possible configuration in relation to a type B seal is shown in FIG. 5. The seal comprises a first outer section 6 and a second outer 7 section which are made up of an elastomeric polymer, and a middle section 8 made up of an elastomeric composite comprising an elastomeric polymer and NTE filler. The elastomeric polymer of the composite is preferably the same polymer used in the inner and outer sections. The distribution of the NTE filler in the middle section may be homogenous or graded (stepwise or continuous).

Figure 6:
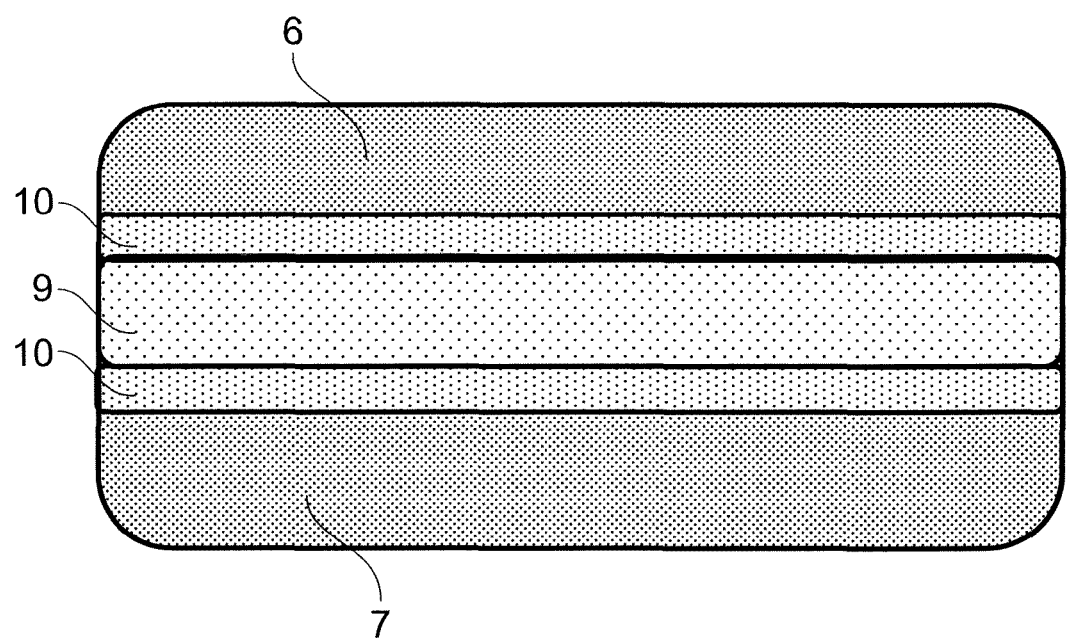
FIG. 6 is a transverse cross-section of a flat ring gasket according to the invention.

In another setting the NTE-containing seal can be composed of one or multiple plies of NTE elements made up of an elastomeric composite as described above. These layers could be concentric or laminar-shaped in their cross section depending on seal or gasket geometry (as shown, e.g. FIG. 6), and bonded to the base polymer seal structure. In the embodiment of FIG. 6, the NTE elements comprise a central ply 9 having intermediate plies 10 on each side. The amount of NTE filler in each ply is variable, i.e. the amount of NTE filler may be higher in the central ply than in the intermediate plies, or the opposite. The different NTE plies 9, 10 may be of a single or variable composition of elastomeric composite. As shown in FIG. 5, the seal of FIG. 6 also comprises a first outer section 6 and a second outer 7 section which are made up of an elastomeric polymer.

Figure 7:
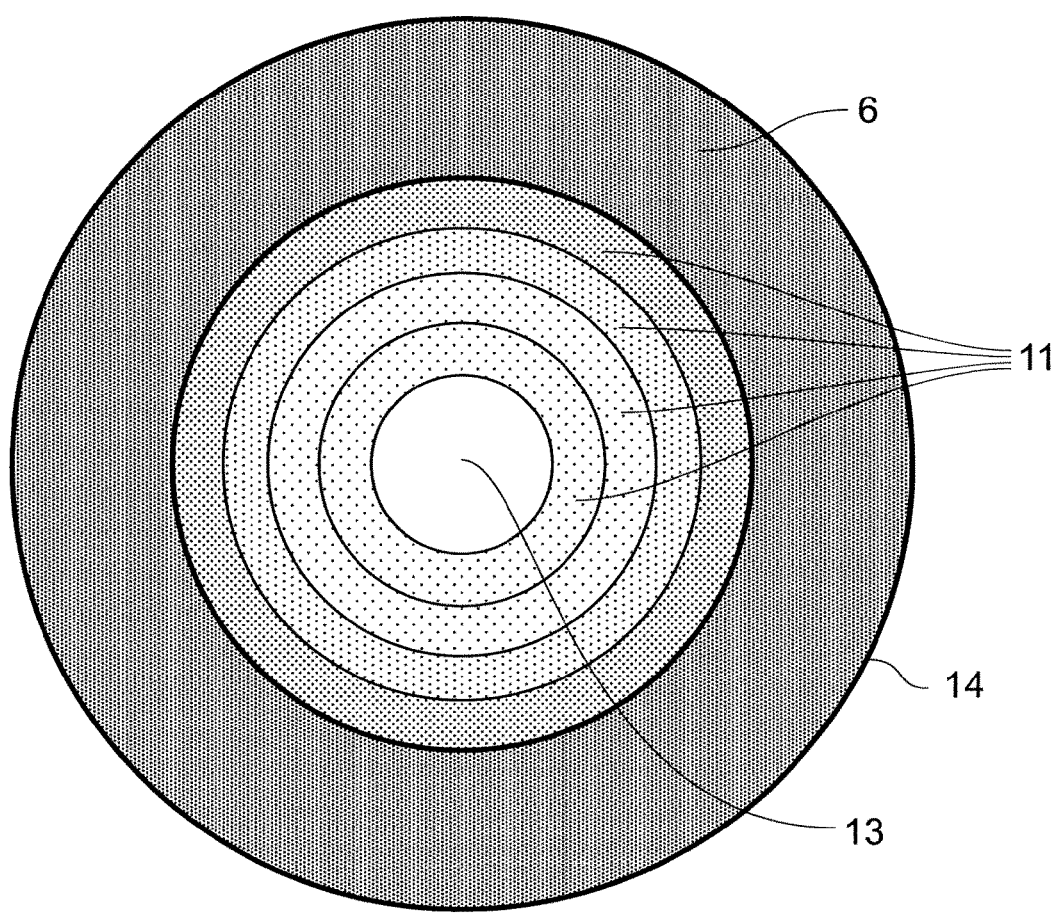
FIG. 7 is a transverse cross-section of an O-ring according to the invention.

A transverse cross-section of an O-ring seal according to the invention is shown in FIG. 7. The seal has multiple concentric layers of elastomeric composites 11, wherein each layer comprises a different amount of NTE filler, and an outer layer 6 of a suitable elastomeric polymer. The amount of filler may either increase or decrease in each consecutive layer, such that a stepwise gradient of NTE filler is obtained in the direction from the center 13 of the cross-section towards the surface 14. In further embodiments of such a seal, the number of layers may be increased to obtain a close to continuous, or true, gradient of NTE filler. In this embodiment, the surface is in an elastomeric polymer without any NTE filler.

All embodiments shown in FIGS. 5-7 are described as having an outer layer/section/surface made in from elastomeric polymer not comprising NTE filler. However, they may also advantageously comprise an NTE filler when said filler does not contribute to any damaging abrasive action on the elements to be sealed.

For either molded-in, co-molded or bonded NTE element solutions, regardless of shape and location, it might be desirable to have one or several intermediate layers between the NTE element and the base elastomer in order to achieve good affinity and provide a smooth transition of the external and internal forces acting in the seal. As such, one or several coats, coupling agents or binders may be used. The intermediate layers might be formulated with compounds reactive to both the NTE material and the base polymer, forming strong covalent bonds (e.g. attracting double carbon bonds in rubber), or other interlinks. For example, hydrogen bonds towards oxygen in NTE ceramic materials.

Figure 8:
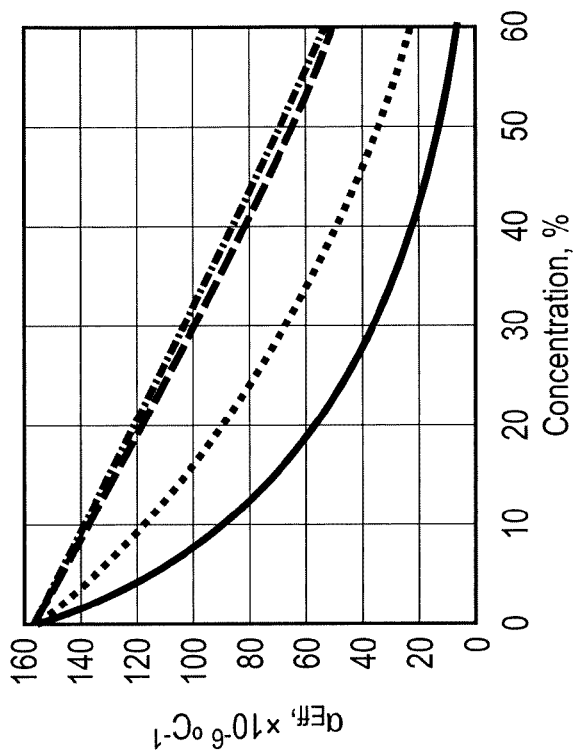
FIG. 8 is a graphical representation of the effects of concentration and shape of NTE particles in a composite.
Figure 8:
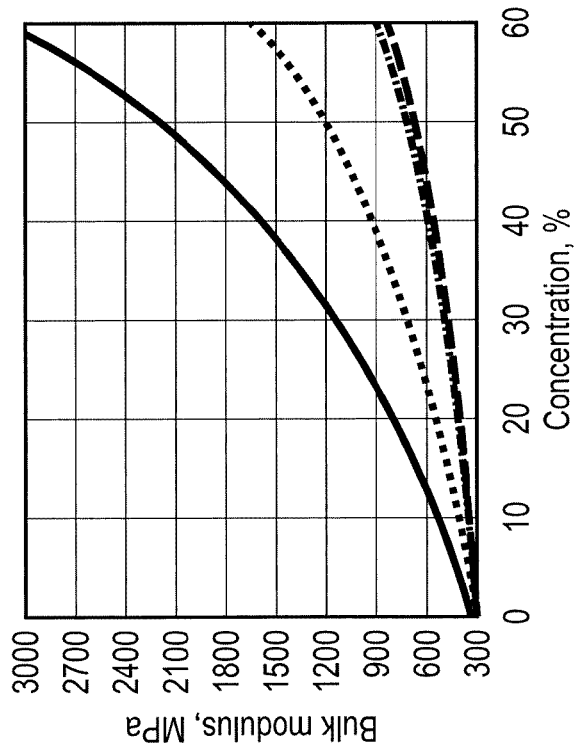
Figure 8:
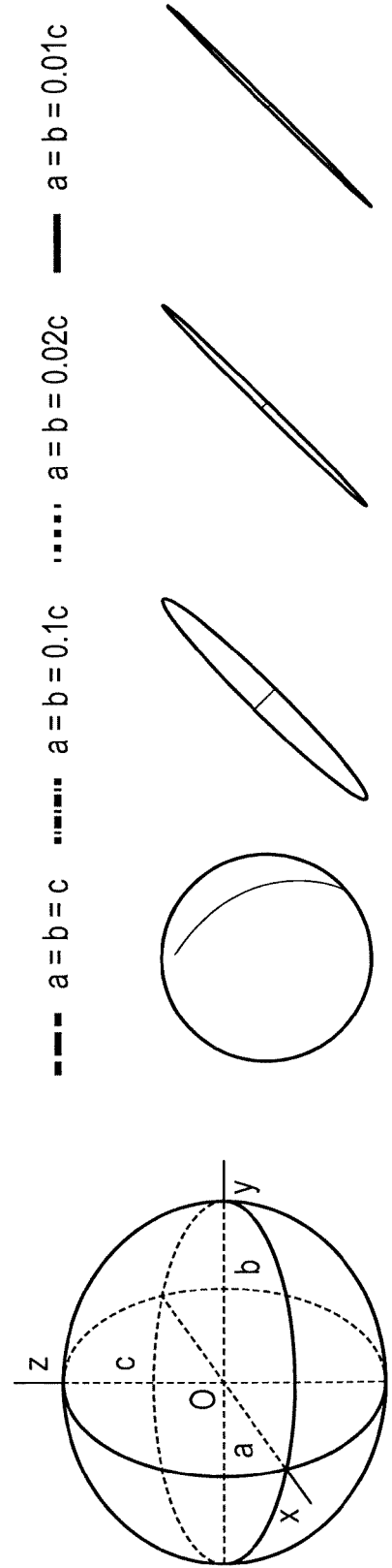

The required volume of the NTE filler, based on the total volume of the elastomeric composite comprising the elastomeric matrix, the NTE-filler and any other additives used in the manufacture of the final seal material, depends on its properties and the physical qualities of the elastomer matrix. The effect of NTE material volume fraction and shape is exemplified in FIG. 8 based on a $ZrW_2O_8$ filler (ref. Kanaun S. K., Levin V. M. Self-consistent methods for composites. V. 1: Static Problems, Springer, 2007, 392). Thus, the NTE filler volume fraction, based on the total volume of the elastomeric composite at 20° C., will generally be within the range of 1% to 60%, and most preferably in the range of 5% to 50%. The total volume of the elastomeric composite includes the NTE filler, other fillers, as well as additives, assuming no voids or free volume exist in the blend. Alternatively, the amount of NTE filler in the elastomeric composite may be defined as being in the range of 1-80% per weight (w/w), preferably 5-60% w/w, based on the total weight of the elastomeric composite.

The NTE filler may be any suitable material having a negative thermal expansion coefficient (NCTE) of $-6 \times 10^{-6}$ °C.$^{-1}$ and lower, for full advantage of the invention preferably $-30 \times 10^{+6}$ °C.$^{-1}$ and lower, and even more preferably less than $-60 \times 10^{-6}$ °C.$^{-1}$. Examples of NTE materials are metal tungstates, metal phosphates, metal molybdates, metal vanadates, metal arsenates, metal oxides (glass ceramics), and metal nitrides, as disclosed in U.S. Pat. Nos. 5,322,559, 5,433,720, 5,514,360, 5,919,720, 6,521,556, and 7,632,480. An NTE effect can also be achieved by adding other compounds as well as substances with phase transformations over a certain temperature span down to $-50°$ C. The preferred NTE fillers are bismuth nickelates (general chemical formula $Bi_{1-x}M_xNiO_3$, where M represents a metal and x is a numerical value from 0 to 0.2), zirconium tungstate (chemical formula $ZrW_2O_8$), hafnium tungstate ($HfW_2O_8$), $Zr_2P_2WO_{12}$, $Hf_2P_2WO_{12}$, and magnetic nanocrystalline materials, such as CuO-nanocrystals, metal alloys like Invar $Fe_3Pt$, and metal cyanides like $Cd(CN)_2$.

The NTE filler may be introduced into the elastomeric polymer as nanoparticles having a particle size from 0.1 nm and larger, fine grain powder, granules and fibers of different shapes and dimensions, with the resulting composite then molded into at least parts of a seal. Introduction of the NTE material into the base polymer should preferably be done by blending prior to curing or vulcanization. The elastomeric composite with the NTE filler may be prepared by conventional elastomeric seal manufacturing processes using any necessary further components like other fillers, curing agents, plasticizers, pigments, etc.

The invention claimed is:

1. A pressure containment equipment seal comprising an elastomeric composite, said composite comprising an elastomeric polymer and a negative thermal expansion (NTE) filler, the NTE filler having a coefficient of thermal expansion (CTE) lower than $-6 \times 10^{-6}$ K$^{-1}$ within a temperature range of 220-293 K and being present in an amount of 0.01-50 volume % based on the total volume of the elastomeric composite at 20° C., and wherein a surface of the seal is free of the NTE filler and an outer layer of the seal is made of an elastomeric polymer not comprising an NTE filler.

2. The pressure containment equipment seal according to claim 1, wherein the elastomeric composite constitutes more than 10 volume %, of said seal, based on the total volume of the seal.

3. The pressure containment equipment seal according to claim 1, wherein the amount of NTE filler is in the range of 1.0-30 volume % based on the total volume of the elastomeric composite at 20° C.

4. The pressure containment equipment seal according to claim 1, wherein the NTE filler has a CTE lower than $-6 \times 10^{-6}$ K$^{-1}$ at a temperature within a range of 220-293 K.

5. The pressure containment equipment seal according to claim 1, wherein the NTE filler has a CTE lower than $-6 \times 10^{-6}$ K$^{-1}$ over a temperature range of 220-293 K.

6. The pressure containment equipment seal according to claim 1, wherein the NTE filler is evenly distributed in the elastomeric composite.

7. The pressure containment equipment seal according to claim 1, wherein the amount of NTE filler in the elastomeric composite decreases or increases over at least one dimension of the seal.

8. The pressure containment equipment seal according to claim 7, wherein the amount of NTE filler in the elastomeric composite decreases or increases in relation to a distance from the surface of the seal.

9. The pressure containment equipment seal according to claim 7, wherein the amount of NTE filler decreases in one of a stepwise or a continuous manner.

10. The pressure containment equipment seal according to claim 1, wherein the elastomeric polymer is a synthetic rubber.

11. The pressure containment equipment seal according to claim 10, wherein the synthetic rubber is a material selected from the group consisting of NBR (nitrile butadienes), HNBR (hydrogenated nitrile butadienes), FKM (fluoroelastomers), FFKM (perfluoroelastomers), and any combination thereof.

12. The pressure containment equipment seal according to claim 1, wherein the NTE filler is a material selected from the group consisting of metal tungstates, metal phosphates, metal molybdates, metal vanadates, metal arsenates, metal nickelates, metal oxides, metal nitrides, metal cyanides, magnetic nanocrystalline materials, Invar alloys, and any combination thereof.

13. The pressure containment equipment seal according to claim 1, wherein the elastomeric composite retracts less than 0.001% over a temperature decrease of 1° C. within a temperature range of −50° C. to +20° C.

14. A method for manufacturing a pressure containment equipment seal, the method comprising:

providing an elastomeric composite comprising an elastomeric polymer and a negative thermal expansion (NTE) filler, the NTE filler having a coefficient of thermal expansion (CTE) lower than $-6 \times 10^{-6}$ K$^{-1}$ within a temperature range of 220-293 K and being present in an amount of 1.0-30 volume % based on the total volume of the elastomeric material at 20° C., and wherein a surface of the seal is free of the NTE filler and an outer layer of the seal is made of an elastomeric polymer not comprising an NTE filler; and forming the elastomeric composite into a desired shape of the seal.

15. The pressure containment equipment seal according to claim 8, wherein the amount of NTE filler decreases in one of a stepwise or a continuous manner.

16. The pressure containment equipment seal according to claim 12, wherein the NTE filler is a material selected from the group consisting of zirconium tungstate (ZrW$_2$O$_8$), hafnium tungstate (HfW$_2$O$_8$), Zr$_2$P$_2$WO$_{12}$, Hf$_2$P$_2$WO$_{12}$, HfMg(WO$_4$)$_3$, BiNiO$_3$, BiNiO$_3$-alloys, CuO-nanocrystals, Cd(CN)$_2$, Invar Fe$_3$Pt, and any combination thereof.

17. The pressure containment equipment seal according to claim 1, wherein the elastomeric composite constitutes more than 25 volume % of said seal, based on the total volume of the seal.

18. The pressure containment equipment seal according to claim 1, wherein the elastomeric composite constitutes more than 50 volume % of said seal, based on the total volume of the seal.

19. The pressure containment equipment seal according to claim 1, wherein the NTE filler has a CTE lower than $-15 \times 10^{-6}$ K$^{-1}$ at a temperature within a range of 220-293 K.

20. The pressure containment equipment seal according to claim 1, wherein the NTE filler has a CTE lower than $-25 \times 10^{-6}$ K$^{-1}$ at a temperature within a range of 220-293 K.

21. The pressure containment equipment seal according to claim 1, wherein the NTE filler has a CTE lower than $-30 \times 10^{-6}$ K$^{-1}$ at a temperature within a range of 220-293 K.

22. The pressure containment equipment seal according to claim 1, wherein the NTE filler has a CTE lower than $-35 \times 10^{-6}$ K$^{-1}$ at a temperature within a range of 220-293 K.

23. The pressure containment equipment seal according to claim 1, wherein the NTE filler has a CTE lower than $-15 \times 10^{-6}$ K$^{-1}$ over a temperature range of 220-293 K.

24. The pressure containment equipment seal according to claim 1, wherein the NTE filler has a CTE lower than $-25 \times 10^{-6}$ K$^{-1}$ over a temperature range of 220-293 K.

25. The pressure containment equipment seal according to claim 1, wherein the NTE filler has a CTE lower than $-30 \times 10^{-6}$ K$^{-1}$ over a temperature range of 220-293 K.

26. The pressure containment equipment seal according to claim 1, wherein the NTE filler has a CTE lower than $-35 \times 10^{-6}$ K$^{-1}$ over a temperature range of 220-293 K.

* * * * *